No. 757,563.

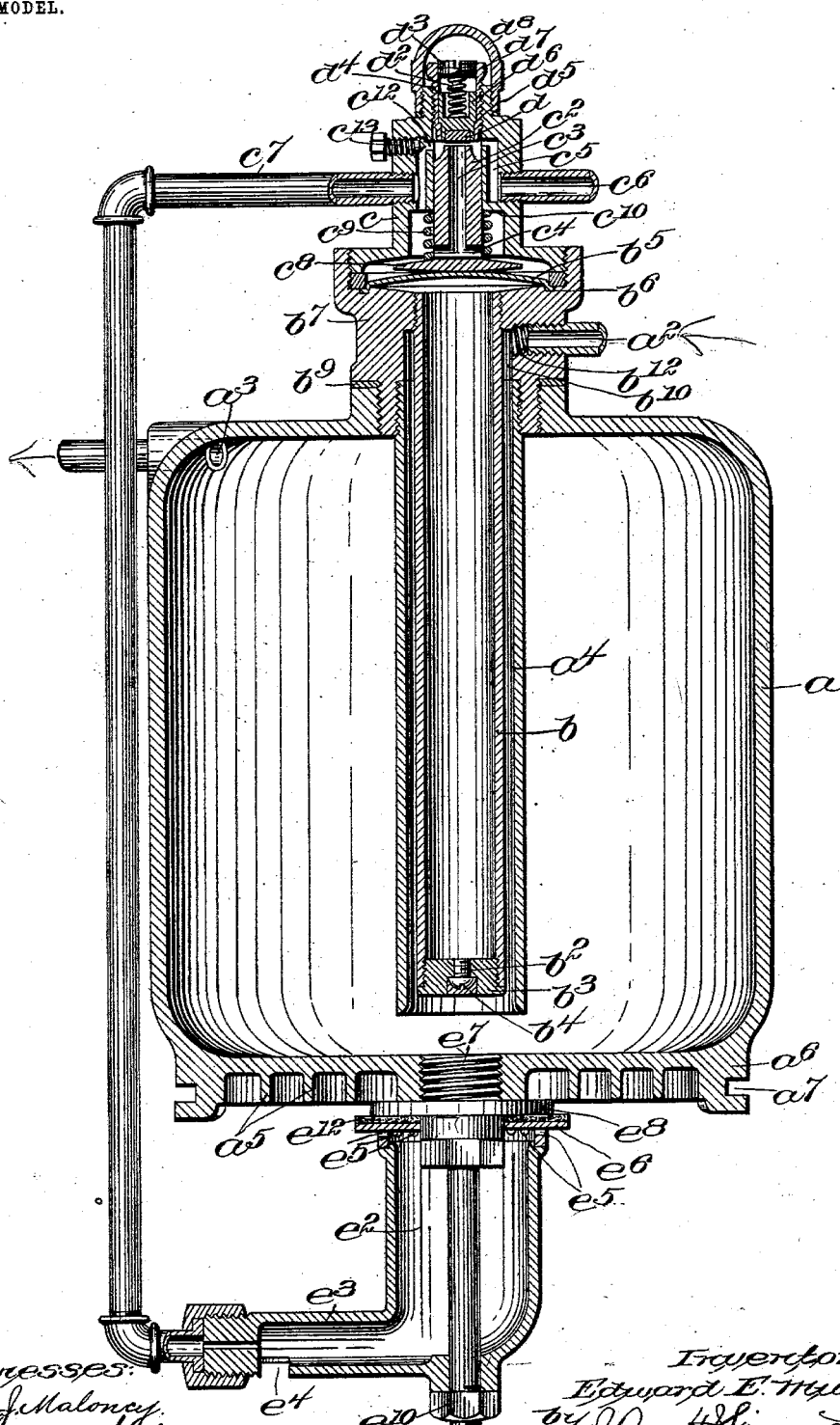

Patented April 19, 1904.

UNITED STATES PATENT OFFICE.

EDWARD E. MURPHY, OF CHELSEA, MASSACHUSETTS, ASSIGNOR TO PUFFER MANUFACTURING COMPANY, A CORPORATION OF MAINE.

WATER-HEATER.

SPECIFICATION forming part of Letters Patent No. 757,563, dated April 19, 1904.

Application filed November 12, 1903. Serial No. 180,823. (No model.)

*To all whom it may concern:*

Be it known that I, EDWARD E. MURPHY, of Chelsea, county of Suffolk, and State of Massachusetts, have invented an Improvement in Water-Heaters, of which the following description, in connection with the accompanying drawing, is a specification, like letters on the drawing representing like parts.

The present invention relates to a heater for liquids of that type in which a burner for gaseous fuel—such, for example, as an ordinary gas-burner—is provided with a controlling device responsive to changes in temperature of the liquid, so that as the liquid cools the burner will be turned on to heat the liquid, and subsequently turned off when the liquid has been heated to the desired degree.

The invention is herein shown as embodied in a heater for water to be used in the dispensing of hot drinks at soda-fountains, for example, and relates mainly to a novel construction and arrangement of the thermostatic controlling-valve, there being, however, other minor features of novelty, which will be hereinafter more fully described.

The drawing is a vertical section of a heater embodying the invention.

The liquid to be heated is contained in a reservoir $a$, having an inlet $a^2$ for the cold liquid and an outlet $a^3$ for the hot liquid, the inlet $a^2$ leading into a tubular passage or duct $a^4$, which extends downward into the body of the receptacle $a$ to a point near the bottom thereof, the said tubular duct closely surrounding a thermostatic device comprising a chamber $b$, hermetically sealed and containing a medium, preferably a fluid, such as oil, which is capable of expansion and contraction under the influence of changes in temperature. The said chamber $b$ is filled with the oil or other suitable medium and then hermetically sealed, said chamber being shown as provided for the purpose with a screw-plug $b^2$, the head of which extends into a recess in a larger plug $b^3$, which is screwed directly into the end of the chamber $b$, and after the said chamber $b$ is filled the recess which contains the head of the screw-plug $b^2$ is filled with molten tin or solder $b^4$, so as to hermetically seal the same.

The fluid in the chamber $b$ is arranged to act upon a diaphragm $b^5$, which controls the fuel-valve, the said diaphragm being herein shown as a disk the edges of which fit in an annular channel $b^6$, in which they are hermetically sealed by a substance, such as solder, the said channel being formed in a plug member $b^7$, having a tubular threaded portion which is screwed into an opening in the upper part of the chamber $a$ and in turn receives the tubular member $a^4$, which forms the duct or passage for the inflowing cold liquid.

Between the member $b^7$ and the top of the chamber $a$ is interposed a suitable packing-gland $b^9$ to prevent leakage. The said member is further provided with an annular chamber $b^{10}$, which surrounds the chamber $b$ and has a lateral inlet portion $b^{12}$, in which the inlet-pipe $a^2$ for the cold liquid is screwed or otherwise fastened. The tubular portion of the chamber $b$ is also screw-threaded at its upper end in the member $b^7$, the diaphragm $b^5$ extending over the open end of the chamber $b$. The said member $b^7$ further affords the support for a valve-shell $c$, which contains the fuel-valve or "gas-valve," as it will be hereinafter referred to, (indicated by the reference-letter $c^2$,) the said valve proper consisting of a plug fitting and longitudinally movable in a passage formed in the shell $c$, said plug being provided with a longitudinal duct $c^3$ and a lateral duct $c^4$, through which the gas or other fuel entering the said passage through a duct $c^5$ from the inlet-pipe $c^6$ can pass freely to the interior of the valve-shell, which has an outlet-pipe $c^7$, leading to the burner $e$ below the receptacle $a$.

The valve $c^2$ is provided at its lower end with a flange $c^8$, which affords an abutment for a spring $c^9$, the other end of which rests against a shoulder $c^{10}$, formed in the valve-shell $c$, the said spring therefore tending to press the valve downward against the diaphragm $b^5$, upon which the flange $c^8$ rests.

The passage above described, which is normally closed by the valve, has the free inlet $c^5$ above the valve and a restricted outlet $c^{12}$ also above the valve and leading to the interior of the valve-shell. As herein shown, the said outlet $c^{12}$ is provided with an adjustable cone-valve $c^{13}$, herein shown as threaded in a wall of the shell, so as to be capable of adjustment. This affords a continually-open port of restricted capacity from the valve-passage to the gas-outlet pipe $c^7$, thereby supplying the small amount of gas burned continuously, so as to keep the burner alight without producing sufficient heat to affect the water in the main receptacle $a$. If the valve $c^2$ is open, however, (it being indicated in the drawing as partially open,) the gas will flow more or less freely from the inlet-pipe $c^6$ through the ducts $c^3$ and $c^4$ to the body of the valve-shell below the valve-passage and thence to the gas-outlet $c^7$, thus causing the burner to give out sufficient heat to affect the water in the receptacle $a$.

The valve $c^2$ is arranged to be closed through the agency of a valve-seat $d$, adapted to cut off the duct $c^3$, the valve $c^2$ being longitudinally movable toward the seat $d$ in response to the action of the diaphragm $b^5$ when the fluid in the chamber $b$ expands.

In order to insure that the valve $c^2$ may be tightly closed when the temperature has risen to the desired extent without risk of bursting the chamber $b$, the seat $d$ is held in its normal position by means of a spring $d^2$, one end of which bears against a plug $d^3$, which is screwed into a tubular member $d^4$, provided with an annular shoulder $d^5$, the seat $d$ being contained in a member $d^6$, having a similar annular shoulder, the said member $d^6$ being acted upon by the spring $d^2$ so as normally to rest against the annular shoulder $d^5$. Thus even if the valve $c^2$ is pressed upward a little beyond the position of the seat $d$ the said seat will yield and prevent any liability of damage, at the same time tightly closing the valve and cutting off the supply of gas except for the by-pass, which supplies the small amount utilized as the pilot-burner.

In order to adjust the device for different temperatures, the member $d^4$ is externally threaded and screwed into an opening in the top of the valve-shell $c$, being provided with a thumb-screw $d^7$, by which it may be readily adjusted. These parts are all inclosed by a removable cap $d^8$, which prevents any accidental change of the adjustment and also protects the parts.

It will be seen that if a high temperature is desired it can be obtained by turning the member $d^4$ so as to carry the seat $d$ away from the valve $c^2$, thereby requiring a greater expansion of the fluid in the chamber $b$ before the valve is seated, while if a lower temperature is desired it can be provided for by the reverse action. It will be seen that as soon as any of the hot fluid is drawn off from the receptacle $a$ it will be replaced by the cold fluid from the inlet $a^2$, the said cold fluid coming in close contact throughout its entire length with the wall of the chamber $b$, thereby acting promptly to reduce the temperature of the liquid in said chamber and cause the contraction of the same, so that the gas-valve is opened almost immediately, turning on a full supply of the gas and causing a large amount of heat to be directed against the wall of the chamber $a$.

The burner $e$ is shown as of the Bunsen type, having a mixing-chamber $e^2$ and an inlet $e^3$, which is coupled to the gas-outlet pipe from the valve-chamber $c$ in any suitable or usual way, the coupling portion $e^3$ of the chamber $e^2$ being provided with an air-inlet $e^4$. The burner-orifices $e^5$ open laterally from the chamber $e^2$ below a flange $e^6$, which is held in place by a plug member $e^7$, which is preferably screwed into the bottom wall of the chamber $a$ to afford the support for the burner and provided with a flange $e^8$, which holds the flange $e^6$ in place. The plug member $e^7$ is provided with a stem which is threaded at its lower end and projects through the bottom of the chamber $e^2$, the parts being secured in place by means of a nut $e^{10}$. In order to prevent any heating of the liquid in the receptacle $a$ in response to the burning of the small amount of gas utilized to keep the burner alight, the flange $e^6$ is covered with a layer of heat-insulating material $e^{12}$, such as asbestos, the said material being held in place between the flanges $e^8$ and $e^6$.

In order to increase the effective heating-surface and to concentrate the heat upon the bottom of the receptacle $a$, the bottom wall of said receptacle is provided with annular corrugations $a^5$. The said wall is also provided with lugs $a^6$, having channels $a^7$, which may be utilized for securing the chamber $a$ and the parts supported thereby to a suitable base. (Not herein shown.)

While the construction herein shown and described constitutes a practical embodiment of the invention, it is not intended to limit the invention to such specific construction and arrangement, since modifications may be made without departing from the invention.

I claim—

1. In a heater for liquids, the combination with a receptacle for the liquid, of a burner below the receptacle, a valve-casing having an outlet-duct to supply the said burner, a valve-passage formed in said casing and having a free inlet for gas and a restricted outlet leading to said casing, a valve having a longitudinal duct to afford communication between said passage and said casing, a valve-seat within said casing to close said duct, and a thermostatic device to control the movement of said valve relative to said valve-seat.

2. In a heater for liquids, the combination with a receptacle for the liquid, of a burner below the receptacle, a valve-casing having an outlet-duct to supply the said burner, a valve-passage formed in said casing and having a free inlet for gas and a restricted outlet leading to said casing, a valve having a longitudinal duct to afford communication between said passage and said casing, a valve-seat within said casing to close said duct, and a closed chamber provided with a diaphragm to act on said plug, and containing an expansible fluid, said chamber projecting into the main receptacle for the liquid.

3. In a heater for liquids, the combination with a receptacle for the liquid, of a burner below the receptacle, an insulating member interposed between said burner and said receptacle, a valve-casing having an outlet-duct to supply said burner, a passage formed in said casing and having a free inlet for gas and a restricted outlet communicating with said valve-casing, a valve-seat within said passage, a valve having a duct to afford communication between said passage and said casing, said duct being closed by said valve-seat, and a thermostatic device to control the movement of said valve, as set forth.

4. The combination with a receptacle for the liquid; of a closed chamber projecting into said receptacle and containing a fluid; a diaphragm at one end of said chamber; a valve-shell above said diaphragm, said valve-shell being provided with an inlet and outlet for fuel; a valve-seat projecting into said valve-shell and held in position by a yielding member such as a spring; means for adjusting the said seat to vary the normal position thereof; a valve controlled by said diaphragm and cooperating with said seat; and a burner, the supply of fuel for which is controlled by said valve, substantially as described.

In testimony whereof I have signed my name to this specification in the presence of two subscribing witnesses.

EDWARD E. MURPHY.

Witnesses:
HENRY J. LIVERMORE,
JAS. J. MALONEY.